United States Patent [19]
Grant

[11] Patent Number: 4,947,069
[45] Date of Patent: Aug. 7, 1990

[54] LOW POWER MAGNETIC TAPE REEL MOTOR AND BRAKE ASSEMBLY

[75] Inventor: Frederic F. Grant, Bellflower, Calif.
[73] Assignee: Datatape, Inc., Pasedena, Calif.
[21] Appl. No.: 364,047
[22] Filed: Jun. 8, 1989
[51] Int. Cl.⁵ ............................................. H02K 7/10
[52] U.S. Cl. ................................... 310/77; 310/688;
    310/93; 310/115; 310/237; 188/166; 188/171
[58] Field of Search ........................ 310/76, 77, 92, 93,
    310/96, 100, 115, 116, 683, 89, 258, 237;
    188/166, 171; 192/1.36, 1.37, 1.39; 242/204;
    324/160; 318/207.25, 361, 372

[56] References Cited

U.S. PATENT DOCUMENTS

| | | | |
|---|---|---|---|
| 1,639,038 | 8/1927 | Jobst | 310/77 |
| 2,037,735 | 4/1936 | Oberhoffken | 310/77 |
| 2,536,491 | 1/1951 | Chapman et al. | 310/77 |
| 3,651,899 | 3/1972 | Yoshii | 188/77 R |
| 4,477,743 | 10/1984 | Apetrei et al. | 310/77 |

FOREIGN PATENT DOCUMENTS

| | | | |
|---|---|---|---|
| 2722584 | 12/1977 | Fed. Rep. of Germany | 310/77 |
| 2805063 | 8/1979 | Fed. Rep. of Germany | 310/77 |
| 2810645 | 9/1979 | Fed. Rep. of Germany | 310/115 |
| 551319 | 2/1943 | United Kingdom . | |

*Primary Examiner*—R. Skudy
*Attorney, Agent, or Firm*—William F. Noval

[57] ABSTRACT

There is disclosed a low power motor and brake assembly for a magnetic tape reel of a magnetic tape recorder/player. The magnetic tape reel is driven by a motor having a rotor fixed to the reel shaft and a stator which is rotatably mounted. A brake assembly includes a brake drum mounted on the reel shaft and a spring loaded brake band engaging the brake drum. One end of the brake band is attached to the stator by a linkage. When the motor is energized, the stator rotates and releases the brake band from the drum by means of rotation of the linkage.

3 Claims, 1 Drawing Sheet

LOW POWER MAGNETIC TAPE REEL MOTOR AND BRAKE ASSEMBLY

BACKGROUND OF THE INVENTION

This invention relates in general to magnetic tape recorder/players and more particularly to a magnetic tape recorder/player having a low power magnetic tape reel motor and brake assembly.

Magnetic tape recorders/players are widely used to recorder analog or digital information on magnetic tape. Generally, the magnetic tape is transported between magnetic tape reels, past a magnetic head assembly. Each reel is rotated by a motor to transport tape at different speeds. Various brake arrangements have been proposed to bring a motor to a stop. In a magnetic tape recorder, it is desirable, that a brake assembly for stopping a reel motor, be disengaged from the motor during tape transport, but be engaged with the motor, when a stop mode is selected or when power is unexpectedly cut off to the motor. Proper braking prevents excess tape to be thrown off the reels. With the ever increasing demand for smaller tape transports, it is also desirable that a reel motor and brake assembly be compact, reliable and uncomplex in design. It is also desirable that the brake be automatically disengaged when the motor is started and engaged when electrical power to the motor is terminated.

Various techniques have been proposed which use additional electrical power for disengaging a brake upon actuation of a motor. One type of electromagnetic brake is disclosed in U.S. Pat. No. 2,536,491, issued Jan. 2, 1951, Inventors Chapman et al and U.S. Pat. No. 4,477,743, issued Oct. 16, 1984, Inventors Apetrei et al. As disclosed in these patents, additional stator and rotor windings are provided to effect an electromagnetic disengagment of a, spring biased, normally engaged, brake when power is applied to the motor. Such a technique is complex, expensive and wasteful of electrical power. Another electromagnetic technique utilizes an externally mounted solenoid which is actuated, when power is supplied to the motor, to disengage a normally engaged brake. U.S. Pat. No. 1,639,038, issued Aug. 16, 1927, Inventor Jobst and U.S. Pat. No. 3,651,899, issued Mar. 28, 1972, Inventor Yoshii, disclose devices which are illustrative of this technique. This technique is disadvantageous because of its waste of power and space and because of its complexity.

In order to minimize the waste of power inherent in electromagnetically actuated brakes, it has been proposed to utilize the reactive force exerted on the stator of a motor, when it is energized, to disengage a normally engaged brake. Such a technique is disclosed, for example, in U.S. Pat. No. 2,037,735, issued Apr. 21, 1936, Inventor Oberhoffken and British Patent No. 551,319, issued Feb. 17, 1943, Inventor King. Although the mechanical arrangements disclosed in these patents minimizes the waste of power inherent in electromechanical arrangements, the disclosed arrangements are relatively complex and wasteful of space. Thus, in the former patent, a bulky disk brake is disengaged by movement of the stator by means of a complex and expensive ball bearing ring mounted between cam plates. Similarly, in the latter British patent, the disclosed brake mechanism is either an expensive disk brake or a nipper post brake (FIGS. 3 and 4) and the brake disengagement device is an expensive and bulky cam arrangement.

SUMMARY OF THE INVENTION

According to the present invention, there is provided a motor and brake assembly for a magnetic tape reel which obviates the disadvantages of known motor and brake assemblies. According to a feature of the present invention, a motor and brake assembly is provided which is low cost, which is simple in design and which minimizes power consumption. According to a feature of the present invention, a magnetic tape reel motor and brake assembly includes a motor having a rotatably mounted rotor and a rotatably mounted stator. A brake includes a brake drum mounted on a rotor shaft and a brake band engaging the brake drum. A linkage between the stator and brake band disengages the brake band from the brake drum when the motor is actuated.

BRIEF DESCRIPTION OF THE DRAWINGS

In the detailed description of a preferred embodiment of the invention presented below, reference is made to the accompanying drawings in which like elements are numbered with like numbers.

DESCRIPTION OF THE PREFERRED EMBODIMENT

In the following description, a preferred embodiment of the present invention will be described with respect to magnetic tape reel motor and brake assembly used in a magnetic tape recorder/player. However, it will be understood that the present invention is more generally applicable to any type of web handling apparatus, in which a web is transported onto and off of a spool or reel which is actuated by a motor and brake assembly.

Figure 2:
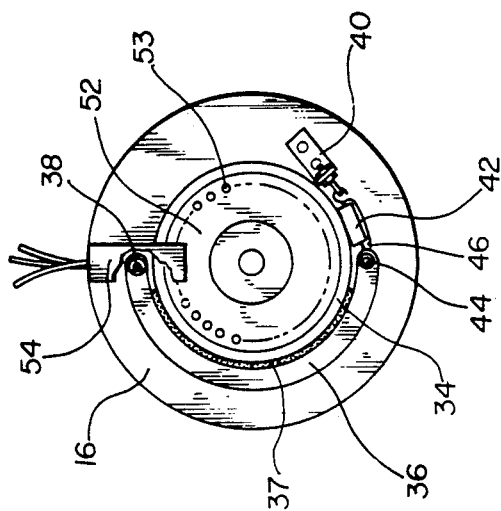
FIG. 2 is a plan view of the embodiment of FIG. 1.
Figure 1:
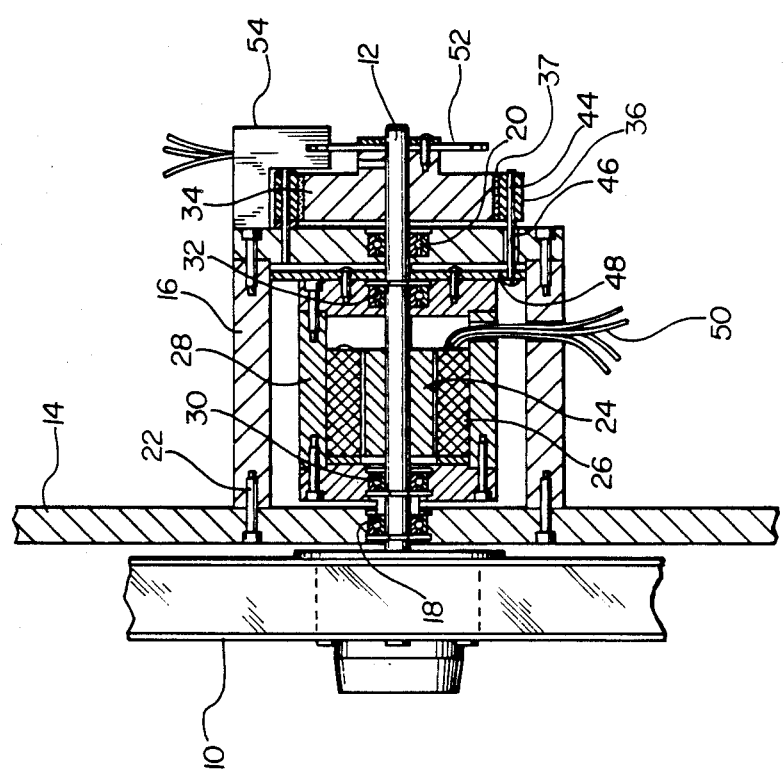
FIG. 1 is a sectional, elevational view of an embodiment of the present invention.

Referring now to FIGS. 1 and 2, there will be described a preferred embodiment of the present invention. As shown, a magnetic tape reel 10 for spooling and unspooling magnetic tape is mounted on a shaft 12. Shaft 12 is rotatably mounted on tape transport plate 14 and motor housing 16 by means of respective bearings 18 and 20. Housing 16 is mounted on plate 14 by means of fasteners 22. A reel motor includes rotor 24 and stator 26. Rotor 24 is mounted on shaft 12 and stator 26 is mounted on stator housing 28. Housing 28 is rotatably mounted on shaft 12 by means of bearings 30 and 32.

A brake includes a brake drum, 34 mounted on shaft 12 and brake band 36 having brake lining 37 (FIG. 2). Band 36 is pivotally mounted at one end on housing 16 by pivot pin 38 and at its other end to a bracket 40, mounted on housing 16, by means of spring 42. A linkage 44 extends through arcuate slot 46 of housing 16. Linkage 44 is mounted at one end to a plate 48 mounted on stator housing 28 and at its other end to the connecting pivot between spring 42 and brake band 36.

Electrical power is supplied to stator 26 by means of electrical conductors 50. A commutator disk 52 is mounted on the end of shaft 12. Markings 53 around the circumference of disk 52 are sensed by sensing unit 54 which provides signals representative of the rotational speed and position of rotor shaft 12 and reel 10.

The operation of the embodiment of the present invention shown in FIGS. 1 and 2 will now be described. When no power is supplied to stator 26 and reel 10 is stopped, spring 42 biases brake band 36 into engagement with brake drum 34 to prevent rotation of rotor shaft 12 and reel 10. When electrical power is supplied to stator 26 by way of electrical conductors 50, an electromotive force is applied to rotor 24 to rotate shaft 12 and reel 10. A reactive force on stator 26 causes rotation of stator 26 and stator housing 28 in a direction opposite to the direction of rotation of rotor 24. Rotation of housing 28 causes linkage 44 to rotate, thereby disengaging brake band 36 from brake drum 34. As long as power is supplied to stator 26, brake band 36 remains disengaged from brake drum 34 and rotor 24 is allowed to rotate freely. However, when power is terminated to stator 26, the reactive force between rotor 24 and stator 26 is terminated and linkage 44 rotates to allow band 36 to engage drum 34. Rotor 24 is stopped as well as shaft 12 and reel 10.

It is seen that the motor and brake assembly according to the present invention is simple in design, compact, reliable, low cost and has low power consumption since extra power is not needed to effect electromechanical disengagement of the motor brake.

The invention has been described in detail with particular reference to preferred embodiments thereof, but it will be understood that variations and modifications can be effected within the spirit and scope of the invention.

What is claimed is:

1. In a web handling apparatus, a low power motor and brake assembly comprising:
    a motor including a motor housing, a motor shaft rotatably mounted by said motor housing, a rotor fixedly mounted on said shaft and a stator rotatably mounted relative to said rotor; wherein said rotor and stator are enclosed by said motor housing;
    a brake including a brake drum fixedly mounted on an extension of said shaft external to said motor housing and a brake band normally biased into engagement with said drum; said brake band being pivotably mounted at one end on said motor housing by a pivot member and at said band's other end by means of a spring; and
    a linkage connected between said stator and said brake band, and extending through an arcuate slot in said motor housing such that when electrical power is applied to said stator, a reactive force, between said rotor and said stator, causes said stator to rotate relative to said rotor, thereby causing said linkage to disengage said brake band from said brake drum.

2. In a magnetic tape recorder/player having a magnetic tape reel, a low power reel motor and brake assembly comprising:
    a motor including a motor housing, a motor shaft rotatably mounted by said motor housing and connected to said magnetic tape reel, a rotor fixedly mounted on said shaft and a stator rotatably mounted relative to said rotor; wherein said rotor and said stator are enclosed by said motor housing;
    a brake including a brake drum fixedly mounted on an extension of said shaft external to said motor housing and a brake band normally biased into engagement with said drum; said brake band being mounted on said housing by a pivot at one end thereof and a spring at the other end thereof; and
    a linkage connected between said stator and said brake band, and extending through an arcuate slot in said motor housing such that when electrical power is applied to said stator, a reactive force, between said rotor and said stator, causes said stator to rotate relative to said rotor thereby causing said linkage to disengage said brake band from said brake drum.

3. The assembly of claim 2 including (a) a commutator disk mounted on the end of said motor shaft and overlying said brake; and (b) a sensing unit mounted on the end of said motor housing for sensing said commutator disk and for producing signals representative of the rotational speed and position of said motor shaft.

* * * * *